(12) United States Patent
Zheng et al.

(10) Patent No.: US 7,738,202 B1
(45) Date of Patent: Jun. 15, 2010

(54) WIDE-BIPHASE-DETECTOR QUALITY MONITOR FOR SENSING OF PIN LAYER REVERSAL

(75) Inventors: Pei-hui Zheng, Medfield, MA (US); Jingfeng Liu, Longmont, CO (US); Sal Citta, Charlton, MA (US)

(73) Assignee: Seagate Technology, LLC, Longmont, CO (US)

( * ) Notice: Subject to any disclaimer, the term of this patent is extended or adjusted under 35 U.S.C. 154(b) by 391 days.

(21) Appl. No.: 11/544,854

(22) Filed: Oct. 6, 2006

Related U.S. Application Data

(60) Provisional application No. 60/725,039, filed on Oct. 7, 2005.

(51) Int. Cl.
*G11B 5/09* (2006.01)

(52) U.S. Cl. ............................. 360/46; 360/31; 360/53; 360/65; 360/75

(58) Field of Classification Search ........................ None
See application file for complete search history.

(56) References Cited

U.S. PATENT DOCUMENTS

| | | | |
|---|---|---|---|
| 5,036,408 A | | 7/1991 | Leis et al. |
| 5,341,387 A | | 8/1994 | Nguyen |
| 5,345,342 A | | 9/1994 | Abbott et al. |
| 5,384,671 A | | 1/1995 | Fisher |
| 5,430,768 A | * | 7/1995 | Minuhin et al. ............. 375/340 |
| 5,650,887 A | * | 7/1997 | Dovek et al. .................. 360/75 |
| 5,661,760 A | * | 8/1997 | Patapoutian et al. ........ 375/341 |
| 5,687,164 A | * | 11/1997 | Takahashi et al. ........... 370/207 |
| 5,862,005 A | * | 1/1999 | Leis et al. ...................... 360/27 |
| 6,201,652 B1 | * | 3/2001 | Rezzi et al. .................... 360/40 |
| 6,295,175 B1 | * | 9/2001 | Tomita et al. ................. 360/31 |
| 6,507,447 B1 | * | 1/2003 | Takahashi .................... 360/46 |
| 6,724,555 B2 | * | 4/2004 | Ohta .......................... 360/65 |
| 6,909,567 B2 | * | 6/2005 | McClellan et al. ............ 360/46 |
| 6,912,099 B2 | * | 6/2005 | Annampedu et al. .......... 360/39 |
| 6,965,229 B2 | * | 11/2005 | Duan et al. ................. 324/210 |
| 2002/0063984 A1 | * | 5/2002 | McClellan et al. ............ 360/46 |
| 2003/0055572 A1 | * | 3/2003 | Kuki et al. .................... 702/26 |
| 2004/0190646 A1 | * | 9/2004 | Aziz .......................... 375/319 |
| 2005/0231844 A1 | * | 10/2005 | Annampedu et al. .......... 360/46 |
| 2006/0023583 A1 | * | 2/2006 | Annampedu et al. ....... 369/47.1 |

\* cited by examiner

*Primary Examiner*—Dismery E Mercedes
(74) *Attorney, Agent, or Firm*—Cesari and McKenna, LLP

(57) ABSTRACT

An apparatus and method are disclosed for decoding servo data recorded on a magnetic disk drive and detecting pinned layer reversals and signal errors, for example, errors due to noise. The servo data is encoded using wide-bi-phase encoding. This encoding is detected by a magneto-resistive sensor that senses the magnetization in domains passing by the sensor. The decoder includes an A/D converter for sampling the signals emitted by the sensor, to provide a sequence of the encoded data. A trellis, such as a Viterbi trellis, is employed to decode the samples generated by the converter. The trellis includes nodes representing states, connected by paths representing transitions, among the nodes. A quality value is generated for the transitions, the quality value representing the distance between each sample in the sequence output by the A/D converter and a corresponding expected sample. By applying servo data to two trellises, each corresponding to a different pinned layer magnetic orientation, and comparing the quality values produced, the correct pinned layer orientation may be selected.

15 Claims, 4 Drawing Sheets

A. TRANSITION FROM 0 TO 0, $\bar{a} = [1\ \ 1\ \ -1\ \ -1]$
B. TRANSITION FROM 1 TO 1, $\bar{a} = [-1\ \ -1\ \ 1\ \ 1]$
C. TRANSITION FROM 1 TO 0, $\bar{a} = [-1\ \ -1\ \ 0\ \ 0]$
D. TRANSITION FROM 0 TO 1, $\bar{a} = [1\ \ 1\ \ 0\ \ 0]$ A. TRANSITION FROM 1 TO 1, $\hat{a} = [-2\ -2\ 2\ 2]$
B. TRANSITION FROM 0 TO 0, $\hat{a} = [2\ 2\ -2\ -2]$
C. TRANSITION FROM 0 TO 1, $\hat{a} = [1\ 1\ 1\ 1]$
D. TRANSITION FROM 1 TO 0, $\hat{a} = [-1\ -1\ -1\ -1]$

WIDE-BIPHASE-DETECTOR QUALITY MONITOR FOR SENSING OF PIN LAYER REVERSAL

CROSS-REFERENCE TO RELATED APPLICATION

The present Application claims the benefit of U.S. Provisional Patent Application Ser. No. 60/725,039, which was filed on Oct. 7, 2005, by Zheng et al. for a Wide-Biphase-Detector Quality Monitor, which is incorporated by reference herein.

BACKGROUND OF THE INVENTION

1. Field of the Invention

The invention relates generally to the detection of pin layer reversal (PLR) in a disk drive using a magneto-resistive head and also to signal degradation, for example, damage to the disk drive, and/or domain wall movement of information recorded in the servo portion on the disk.

2. Background Information

A magneto-resistive head used in a disk drive includes a pinned layer of magnetic material which ideally has a fixed direction. As the magnetic domains on the disk pass under the head, the direction of the magnetization of each domain either adds to, or subtracts from, the magnetization of the pinned layer. The head senses the direction of each domain by means of a change in resistance of the head in response to the sum of the magnetization of the domain and that of the pinned layer. The direction of the pinned layer magnetization is set at the factory and the decoding of data on the disk drive is determined by that direction. That is, the direction is assumed in the circuitry that detects and decodes the data.

However, from time to time, the magnetization of the pinned layer may reverse, due to various causes. This results in a reversal of the perceived bits on the disk, i.e. zeros are interpreted as one's and one's interpreted as zero's. There is a need to detect pinned layer reversal. Also there is a need to detect noise, for example noise introduced by damage to the head or disk, or by domain wall movement that may occur in the soft under layer used in perpendicular recording systems.

SUMMARY OF THE INVENTION

Wide bi-phase encoding is often used with disk drive servo data to achieve better bit error rates than other encoding schemes subject to the same signal-to-noise ratios. This arrangement encodes a "1" user bit to a recorded "1100" and a "0" user bit to a recorded "0011." A recorded "0" is represented by a magnetic polarity pointing in one direction and a recorded "1" is represented by a magnetic polarity pointing in the opposite direction. The signals from the head are applied to a preamplifier and, to an analog/digital converter, and then passed to a sequence detection channel to yield user bits.

In the detection channel, the recorded bit stream ultimately passes to a sequence detector, such as a Viterbi sequence detector, that is configured to find a most likely sequence of recorded bits. Correct framing of the recorded bit sequence from the disk requires knowledge of the signal polarity beforehand. Generally, this information is pre-determined extrinsically. For example, once the pinned layer in the magneto-resistive head and the head connection are given and the signal path at the analog front end is known, the signal polarity from a 0 to 1 transition on the disk is determined. Typically, the polarity of the incoming signal will not change over the life of the disk drive. However, occasionally, the pinned layer of a magneto-restrictive head might flip by itself after some usage or under some extreme conditions. This phenomenon is known as pin layer reversal (PLR). Ordinarily PLR is detected early in the drive manufacture process to guarantee the quality of the shipped drives. On the other hand, PLR may need to be detected on the fly for drives in the field to avoid loss of customer data if PLR does occur. An object of this invention is to detect and correct for PLR and also to monitor other signal degradation phenomena, for example, noise introduced by damage to a head or to the disk, or by domain wall movement that may occur in the soft under layer used in perpendicular recording systems.

Generally, data tracks on a magnetic disk are divided into a plurality of sectors. Each sector includes a servo header. By reading servo information embedded within the data tracks, head position may be estimated. Typically, servo headers include a preamble field, a header synchronization field, a coded track address field, as well as other fields. Each bit in these fields may be encoded as a sequence of recorded bits on the disk. For example, each "0" in the user data may be encoded as "0011" on the disk, and each "1" may be encoded as "1100."

According to one embodiment of the present invention, a detector employs a pair of trellises, such as Viterbi trellises, to which the sampled recorded bits are applied. One of these trellises is arranged to converge if the pinned layer has a polarity in one direction and the other trellis is arranged to converge if the polarity has the opposite direction. Thus, if the incoming sampled recorded bits follow an allowed path through one of the trellises, the pinned polarity corresponds to that trellis. If the sampled recorded bits follow an allowed path through the other trellis, the pinned polarity must be opposite. In this manner the pinned polarity may be determined.

Actually, because of noise in the signals entering the trellises, neither trellis will ordinarily converge to the correct output. Accordingly, in one embodiment, a quality factor is determined for each of the trellis outputs, and the one with the lower quality factor is selected. Specifically, for each user bit applied to a trellis, a quality factor, q, is calculated for the bit according to the Euclidean distance of the value of the recorded bits from the expected value of the recorded bits. The quality values of all the recorded bits corresponding to the associated user bits are summed and the lowest sum corresponds to the selected path, and thus to the value of the encoded user bit. With this arrangement, embodiments of the present invention can detect incorrect framing of the bits applied to the to trellises, detect pin layer reversals, as well as otherwise measure noise introduced by a variety of means.

BRIEF DESCRIPTION OF THE DRAWINGS

The invention description below refers to the accompanying drawings, of which.

DETAILED DESCRIPTION OF AN ILLUSTRATIVE EMBODIMENT

Figure 1:
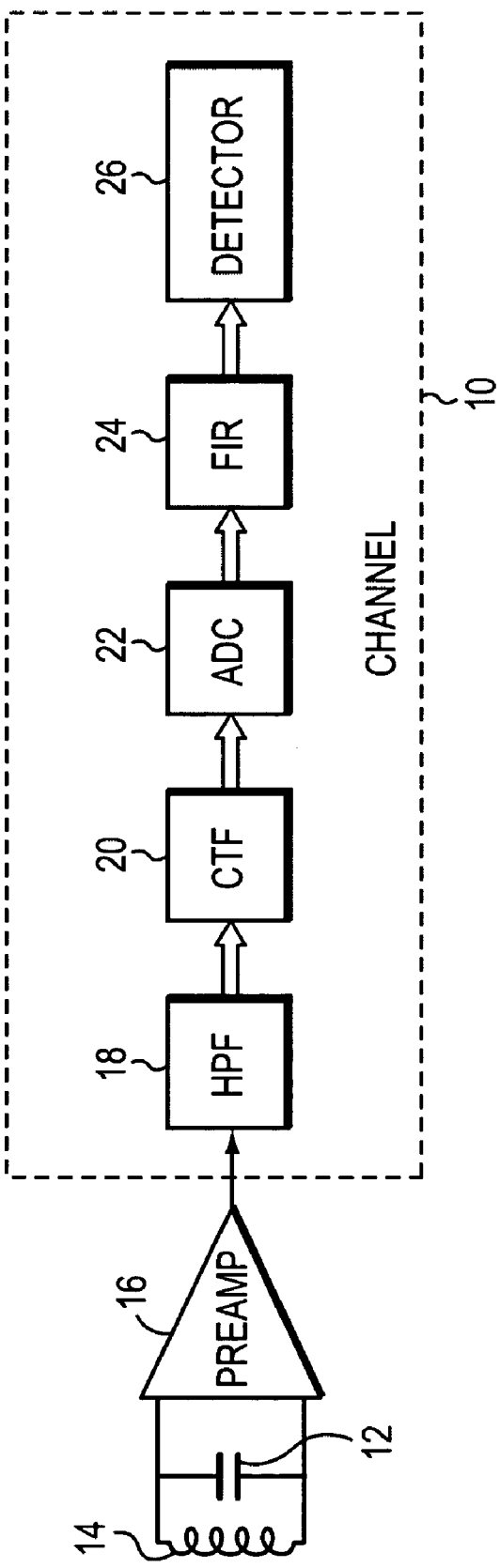
FIG. 1 is a diagram of an example decoder arrangement employing a Viterbi detector.

With reference to the example embodiment in FIG. 1, a detection channel 10 detects and decodes the data read from a magnetic disk (not shown) by a magneto-resistive head 12. The head comprises a magneto-resistive sensor 14 and a preamplifier 16. The output of the preamplifier 16 is applied to a high pass filter (HPF) 18 whose output is fed to a continuous time filter (CTF) 20, whose output in turn is digitized by an analog/digital converter (ADC) 22. The sample stream from the analog/digital converter 22 is passed through an optional finite impulse response filter (FIR) 24 to a sequence detector, such as a Viterbi detector 26, whose output represents the stream of bits originally recorded as magnetization directions on the disk described above. The operations of the FIR 24 and the Viterbi detector 26 may be performed in software execution on a processor (not shown). Further details regarding Viterbi detectors may be found in U.S. Pat. No. 5,661,760 to Patapoutian et al., title "Wide Biphase Digital Servo Information Detection, And Estimation For Disk Drives Using Servo Viterbi Detector," which is incorporated by reference herein.

A typical disk track is divided into sectors, each of which begins with servo information. Specifically, each sector on a track begins with a servo header comprising a preamble field, a header synchronization field, a coded track address field, a position error field, and possibly other fields. It is especially important that the preamble field and the track number field are read correctly to properly position the head 12 and its output. Otherwise user data generally may not be recovered from the disk. Further details regarding such fields and their use may be found in U.S. Pat. No. 5,384,671 to Fisher et al., titled "PMRL Sampled Data Channel Synchronous Servo Detector," as well as U.S. Pat. No. 5,345,342 to Abbot et al., titled "Disk Drive Using PRML Synchronous Sampling Data Detection and Asynchronous Detection of Embedded Sector Servo," both of which are incorporated by reference herein.

The techniques disclosed herein may be used to detect pinned layer reversal and other errors, in a number of different fields, for example in the preamble field, synch mark field, and track address field, or other fields.

Figure 2:
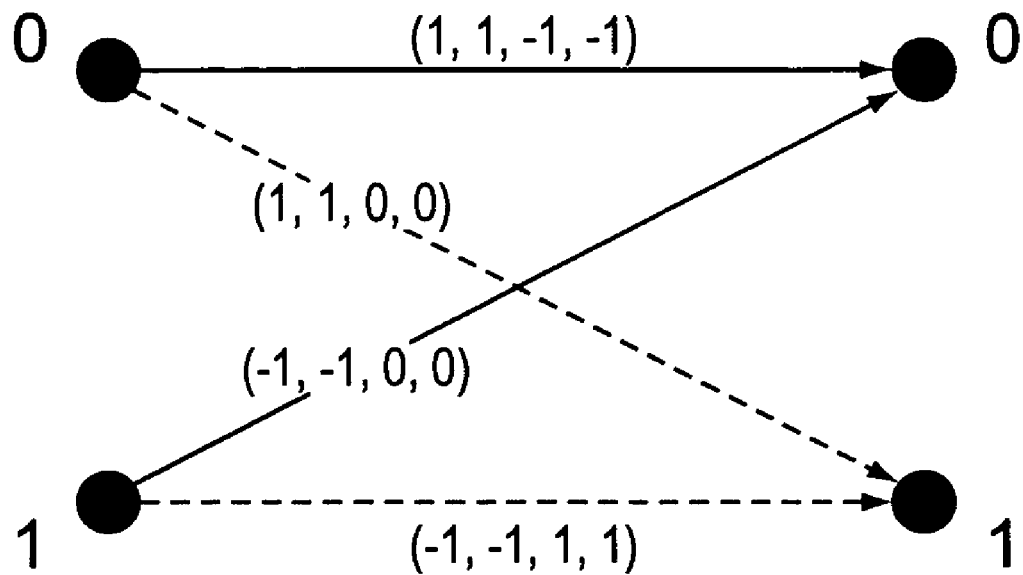
FIG. 2 is a diagram of an example trellis for use with a $1-D^2$ pulse response (partial response, class IV).

In one configuration, the detection channel 10 may include a FIR configured to adjust the samples from the ADC in accord with a $1-D^2$ pulse response (partial response, class IV), where D represents a one bit cell delay. In such a configuration, an example trellis of the Viterbi detector 26 is illustrated in FIG. 2.

Figure 3:
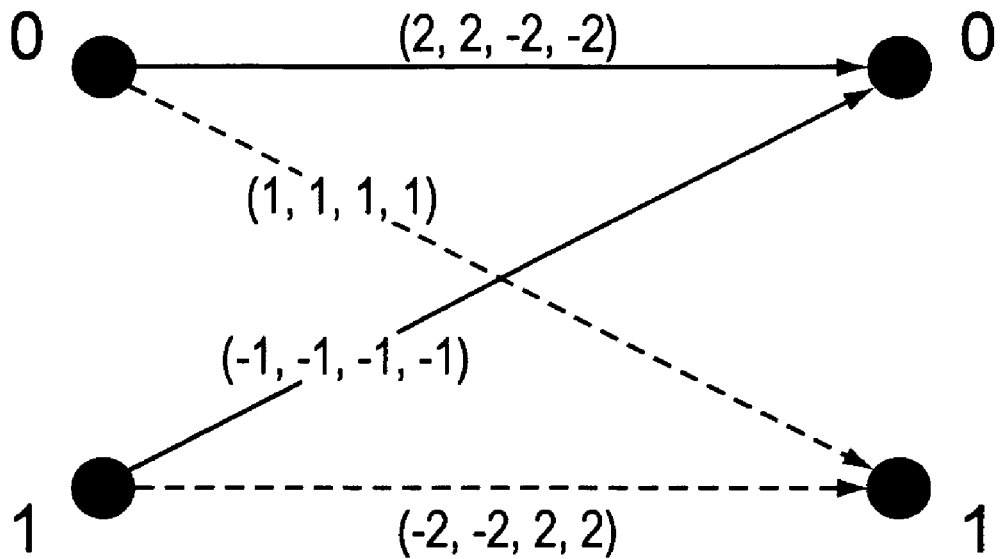
FIG. 3 is a diagram of an example trellis for use with a $1-2D^2+D^4$ pulse response (matched class IV).

In another configuration, another $1-D^2$ filter may be configured downstream of the filter described above, in order to provide digital samples in accordance with a $1-2D^2+D^4$ pulse response (matched class IV). In such a configuration, an example trellis of the Viterbi detector 26 is illustrated in FIG. 3.

In either configuration the quality value of each decoded user bit $q_i$ may be defined as $$q_i = \sum_{j=0}^{3}(a_j - \hat{a}_j)^2,$$

where $\hat{a}_j$'s are the expected sample values for the user bit and $a_j$'s are the values of the incoming samples from the filter 24.

There are at least two ways of defining the quality metric for the whole field. A first type (Type I) involves a quality threshold $\theta$ for each user bit where:

If $q_i < \theta$, $\hat{a}_j$ is declared high quality;

Else if $q_i >= \theta$, $\hat{a}_j$ is declared low quality.

If the number of bits in the field with low quality is greater than another threshold Q, which is the upper limit that the drive firmware can tolerate, the whole field is declared low quality and the drive needs to either record the fact or call for a servo retry.

A second type (Type II) determines the quality of whole field is low if, $$\sum_{i=1}^{N} q_i >= Q,$$

where N is the total number of user bits in the field.

In the example herein, the wide bi-phase sequence detector needs to frame every four incoming bits for each user bit. The framing is achieved by using a known preamble pattern (e.g., a stream of user bit 1s) before the servo synchronization field. Take the example of synchronization field 000110010. Considering the case of the configuration with a $1-2D^2+D^4$ pulse response (matched class IV), the incoming bits just before sync field may be:

. . . -2 -2 2 2 -2 -2 2 2 -2 -2 2 2 -2 -2 2 2 -2 -2 2 2 -2 -2 2 2 -1 -1 -1 -1 2 2 -2 -2 . . . .

Since the preamble field is known as a string of user bit 1's, the detector frames the sample stream as:

. . . [-2 -2 2 2 ][-2 -2 2 2][-2 -2 2 2][-2 -2 2 2][-2 -2 2 2][-2 -2 2 2][-2 -2 -2 -2 ][2 2 -2 -2] . . . .

These samples are decoded as:

1 1 1 1 1 1 0 0

If the signal polarity is reversed due to PLR, the incoming samples become:

. . . 2 2 -2 -2 2 2-2 -2 2 2 -2 -2 2 2 -2 -2 2 2 -2 -2 2 2 -2 -2 2 2 -2 -2 2 1 1 1 1 -2 -2 2 2 . . . .

Without passing the polarity information extrinsically, the detector could frame the sample stream as:

. . . 2 2][-2 -2 2 2][-2 -2 2 2][-2 -2 2 2][-2 -2 2 2][-2 -2 2 2][-2 -2 1 1][1 1 -2 -2][2 2 . . . .

Which is decoded as:

1 1 1 1 1 1 0

First, notice that the framing is off by 2 bits, and the timing information is therefore wrong. Second, the last two frames, [-2 -2 1 1] and [1 1 -2 -2], do not exist in the trellis, and thus are illegal code words. Since the detector has to make a decision, it picks the closest path based on the Euclidean distance instead, which is [-2 -2 2 2] and [-1 -1 -1 -1]. Thus the margin of the detector is sacrificed and it is susceptible to making errors.

If we utilize the quality metrics defined above, for the correct framing and signal polarity, the detector has a quality of 0, while the incorrect framing and opposite signal polarity has a quality of:

$$\sum_{i=1}^{N} q_i = 1 + 1 + 2 \wedge 2 + 2 \wedge 2 + 1 + 1 = 12.$$

This information can be passed back to the detector so it may pick the right polarity, i.e. that which will yield the lesser quality value, and the right framing in the first place.

A similar result is obtained if a $1-D^2$ pulse response (partial response, class IV) is used.

Figure 4:
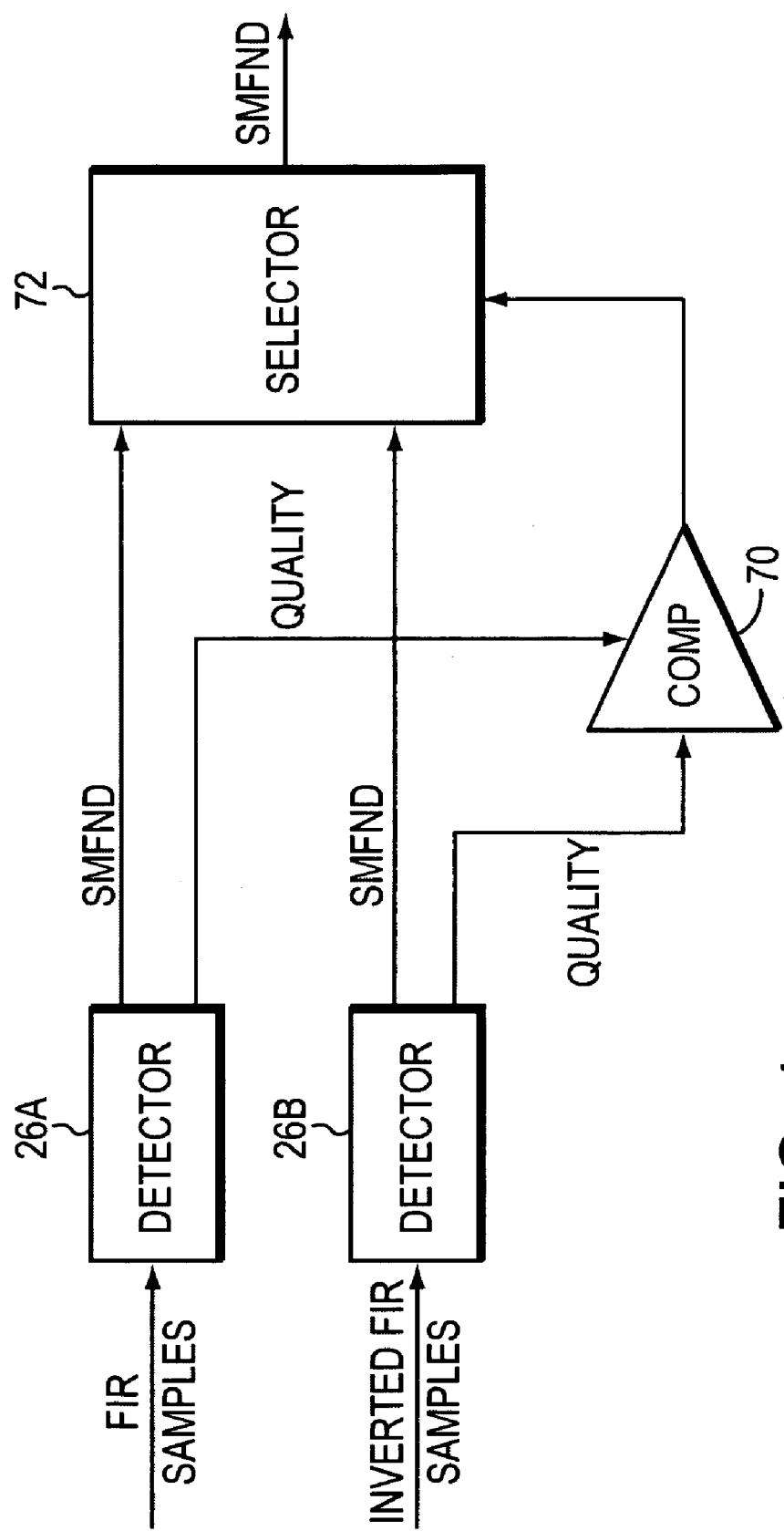
FIG. 4 is a diagram of an example arrangement for detection of pinned layer reversal.

An exemplary hardware implementation is shown in FIG. 4, which enables detection of PLR on the fly. Samples from the FIR 24 are applied to a first sequence detector 26A, for example a Viterbi detector, and inverted FIR samples are applied to an identical second sequence detector, 26B. The quality values from the detectors 26A, 26B are applied to a comparator 70. The output of the comparator controls a selector 72 to pass to the output the decoded bits having the lower quality value.

Since the quality monitor is based on Euclidean distance between received samples and the expected samples of the detector, any deviation from an expected sample value will make the quality metric larger, which includes noise written in by a servo writer, signal degradation due to head flying height change, un-optimized channel, timing error, or noise caused by domain movement in soft under layer (SUL) in perpendicular recording systems. The quality value output by the detector can be accumulated in the manufacturing process to optimize channel servo performances and in the field to monifor signal degradation induced by various noise sources.

This defined quality metric can be used to detect signal polarity changes on the fly in drives using the wide bi-phase encoded servo. This quality monitor can further be used to optimize channel servo performance and detect servo signal degradation induced by various sources, including SUL noise.

The foregoing description has been directed to an example embodiment. It will be apparent, however, that other variations and modifications may be made to the described embodiments, with the attainment of some or all of the advantages. It should be remembered that the procedures and techniques above may be implemented in hardware, or in software, such as in a computer-readable medium having program instructions written therein. Therefore, it is the object of the appended claims to cover all such variations and modifications as come within the true spirit and scope of the invention.

What is claimed is:

1. A decoder for decoding servo data recorded on a magnetic disk drive, said magnetic disk drive having a magneto-resistive head that includes a pinned layer of a predetermined polarity, the servo data recorded using wide-bi-phase encoding of user data recorded in servo fields, the decoder comprising:
    an A/D converter for sampling signals emitted by a magneto-resistive sensor which is configured to sense magnetization in domains within servo fields and to generate a sequence of encoded samples;
    a decoder assembly having a first detector for decoding the sequence of encoded samples generated by the A/D converter, thereby generating a first sequence of decoded bits, said first detector having a first trellis comprising nodes representing states, connected by paths representing transitions among the nodes, said first trellis being arranged to converge if a pinned layer associated with the magneto-resistive sensor has a polarity in a first direction, and said first detector being configured to compute a first quality value for each decoded bit in the first sequence of decoded bits, said first quality value being determined based upon a given actual sample and a corresponding expected sample, in the first sequence decoded bits produced by the A/D converter, said decoder assembly further including a second detector generating a second sequence of decoded bits, said second detector having a second trellis comprising nodes representing states connected by paths representing transitions among the nodes, said second trellis being arranged to converge if the pinned layer has a polarity in a direction opposite to said first direction, and said second detector being configured to compute a second quality value for each decoded bit in the second sequence of decoded bits, said second quality value being determined based upon an actual sample and a corresponding expected sample in the second sequence decoded bits produced by the A/D converter;
    comparator means for comparing the quality value outputs of said first and second detectors, said quality value outputs representing a distance between each actual sample and a corresponding expected sample in the sequence output by the A/D converter the comparator generating an output control signal, which indicates the sequence of decoded bits that has the lower quality value; and
    a selector configured to receive the outputs of the first and second detectors of the decoder assembly and the output control signal of said comparator, the output control signal of said comparator signaling the selector to select the output sequence of decoded bits that has the lower quality value as a selected sequence, and the selector being further configured to determine a pinned layer reversal, if a polarity of the selected sequence of decoded bits is opposite to the predetermined polarity.

2. The decoder of claim 1, in which at least one of the trellises is a Viterbi trellis of a Viterbi detector.

3. The decoder of claim 1, in which:
    the encoded samples represent user bits, each user bit is encoded as a frame of recorded bits; and
    the quality value, q, of each user bit, i, is given by $$q_i = \sum_0^n (a_i - \hat{a}_i)^2,$$

where $\hat{a}_i$ is the value of the expected sample for the recorded bit, and $a_i$ is the value of the corresponding sample output by the A/D converter for the recorded bit, where n is a total number of recorded bits in the frame.

4. The decoder of claim 2, in which, each user bit is encoded as a four-bit frame in the servo fields, and the quality value, q, for each user bit, i, is given by $$q_i = \sum_0^3 (a_i - \hat{a}_i)^2,$$

where $\hat{a}_i$ is the value of the expected sample for the recorded bit, and $a_i$ is the value of the corresponding sample output by the A/D converter for the recorded bit.

5. The decoder of claim 1, wherein the first and second detectors are Viterbi detectors.

6. A method for decoding servo data recorded on a magnetic disk drive, comprising:
    sampling, by an A/D converter, signals that are emitted by a magneto-resistive sensor that reads domains in servo fields on the magnetic disk drive that pass by the sensor, to create a sequence of encoded samples;
    decoding the sequence of encoded samples by a first detector producing a first sequence of decoded bits and by a second detector producing a second sequence of decoded bits by applying the sequence of decoded bits to a dual trellis assembly in which each trellis includes a series of nodes representing states, connected by paths representing transitions among the nodes, a first trellis being arranged to converge if a pinned layer in the magneto-resistive sensor has a polarity in a first direction, and said first detector being configured to compute a quality value for each decoded bit in said first sequence of decoded bits based upon an actual sample and an expected sample, a second trellis comprising nodes representing states connected by paths representing transitions among the nodes, said second trellis being arranged to converge if the pinned layer in the magneto-resistive sensor has a polarity in an opposite direction to the first polarity, and said second detector being configured to compute a quality value for each decoded bit in the second sequence of decoded bits based upon an actual sample and an expected sample;

comparing using a comparator the quality values of said first and second detectors, wherein each quality value is based upon a distance between each sample in the sequence and a corresponding expected sample for the first sequence of decoded bits and the second sequence of decoded bits;

generating at said comparator an output control signal which indicates the sequence of decoded bits that has a lower quality value;

receiving at a selector, the outputs of the first and second detectors and the output control signal from the comparator, the output control signal indicating to the selector to select the sequence of decoded bits having the lower quality value;

and determining a pinned layer reversal when a polarity of the selected sequence of decoded bits is opposite to a predetermined polarity.

7. The method of claim 6, wherein the encoded samples represent user bits, each user bit encoded in a frame of recorded bits.

8. The method of claim 7, further comprising:
calculating the quality value, q, of each decoded user bit, i, by the formula:

$$q_i = \sum_0^n (a_i - \hat{a}_i)^2,$$

where $\hat{a}_i$ is the value of the expected sample for the recorded bit, and $a_i$ is the value of the corresponding sample output by the A/D converter for the recorded bit, where n is a number of recorded bits in the frame.

9. The method of claim 8, in which, with each user bit is encoded as a four-bit frame in the servo fields, and the quality value, q, for each user bit, i, is given by $$q_i = \sum_0^3 (a_i - \hat{a}_i)^2,$$

where $\hat{a}_i$ is the value of the expected sample for the recorded bit, and $a_i$ is the value of the corresponding sample output by the A/D converter for the recorded bit.

10. The method of claim 8, further comprising:
calculating said quality value for a sequence of user bits by summing the quality values of the individual user bits in the sequence.

11. A non-transitory computer readable medium encoded with computer executable instructions operable to:
set a predetermined polarity for a pinned layer of a magneto-resistive head;
sample signals emitted by a magneto-resistive sensor in the magneto-resistive head that reads domains in servo fields on a magnetic disk,
produce a sequence of encoded samples using an A/D converter;
decode the sequence of encoded samples to generate a first and second sequence of decoded bits by applying the sequence of encoded samples to a decoder assembly that has dual trellises, each trellis including a series of nodes representing states, connected by paths representing transitions among the nodes;

and generate, a quality value for each sequence of decoded bits, said quality value representing a distance between each sample in the sequence and a corresponding expected sample for the first sequence of decoded bits and the second sequence of decoded bits;

compare the quality values for each sequence of decoded bits, and select the sequence of decoded bits having the lower quality value;

and determine a pinned layer reversal when a polarity of the selected sequence of decoded bits is opposite to the predetermined polarity.

12. The non-transitory computer readable medium of claim 11, wherein the encoded samples represent user bits and each user bit is encoded in a frame of recorded bits.

13. The non-transitory computer readable medium of claim 12, further comprising program instruction operable to:
calculate the quality value, q, of each decoded user bit, i, by the formula:

$$q_i = \sum_0^n (a_i - \hat{a}_i)^2,$$

where $\hat{a}_i$ is the value of the expected sample for the recorded bit, and $a_i$ is the value of the corresponding sample output by the A/D converter for the recorded bit, where n is a total number of recorded bits in the frame.

14. A method for detecting pin layer reversals on a magnetic disk drive, the method comprising: sampling, at an A/D converter, signals sensed by a magneto-resistive sensor to produce recorded bits;

applying the recorded bits to a first detector to generate a first sequence of decoded bits, wherein the first detector includes a first trellis that is arranged to converge if a pinned layer in the magneto-resistive sensor has a polarity in a first direction, said first detector being configured to compute a quality value for each decoded bit in said first sequence of decoded bits, wherein said quality value is based upon a difference between an actual sample and an expected sample; applying the recorded bits to a second detector to generate a second sequence of decoded bits wherein the second detector includes a second trellis that is arranged to converge if the pinned layer in the magneto-resistive sensor has a polarity in an opposite direction to the first polarity, said second detector being configured to compute a quality value for each decoded bit in said second sequence of decoded bits, wherein said quality value is based upon a difference between an actual sample and an expected sample;

comparing the quality values obtained from the first and second detectors, and selecting the sequence of decoded bits with the lower quality value as a selected sequence; and determining a pinned layer reversal when a polarity of the selected sequence is opposite to a predetermined polarity.

15. The method of claim 14, wherein the first and second detectors are Viterbi detectors.

* * * * *